United States Patent
Chin et al.

(10) Patent No.: US 9,735,569 B2
(45) Date of Patent: Aug. 15, 2017

(54) DRIVING CIRCUIT AND DRIVING METHOD APPLIED TO DISPLAY SYSTEM AND ASSOCIATED DISPLAY SYSTEM

(71) Applicant: Silicon Touch Technology Inc., Hsin-Chu (TW)

(72) Inventors: Chi-Yuan Chin, Taipei (TW); Kuei-Jyun Chen, Taoyuan (TW)

(73) Assignee: Silicon Touch Technology Inc., Hsin-Chu (TW)

( * ) Notice: Subject to any disclaimer, the term of this patent is extended or adjusted under 35 U.S.C. 154(b) by 8 days.

(21) Appl. No.: 14/929,422

(22) Filed: Nov. 2, 2015

(65) Prior Publication Data

US 2016/0181795 A1 Jun. 23, 2016

(30) Foreign Application Priority Data

Dec. 19, 2014 (TW) .............................. 103144565 A

(51) Int. Cl.
  *G09G 5/00* (2006.01)
  *H02H 9/04* (2006.01)
  *G09G 3/32* (2016.01)
  *G09G 3/20* (2006.01)

(52) U.S. Cl.
  CPC .......... *H02H 9/045* (2013.01); *G09G 3/2014* (2013.01); *G09G 3/32* (2013.01); *H02H 9/043* (2013.01); *G09G 2300/0426* (2013.01); *G09G 2310/08* (2013.01); *G09G 2330/04* (2013.01); *G09G 2330/045* (2013.01)

(58) Field of Classification Search
  CPC ...... H02H 9/045; H02H 9/043; G09G 3/2014; G09G 3/32; G09G 2300/0426; G09G 2310/08; G09G 2330/04; G09G 2330/045
  USPC ........................................................ 345/212
  See application file for complete search history.

(56) References Cited

U.S. PATENT DOCUMENTS

| 2007/0046485 | A1 | 3/2007 | Grootes |
| 2007/0069664 | A1* | 3/2007 | Robinson ........... H05B 33/0815 315/312 |

FOREIGN PATENT DOCUMENTS

| JP | 2007287617 A | 11/2007 |
| JP | 2011249328 A | 12/2011 |
| TW | I444092 | 7/2014 |

* cited by examiner

*Primary Examiner* — Claire X Pappas
*Assistant Examiner* — Ngan T Pham Lu
(74) *Attorney, Agent, or Firm* — Winston Hsu

(57) ABSTRACT

A driving circuit applied in a display system includes a node, a current control circuit, a protecting circuit and a timing controller, wherein the node is arranged to connect to a lighting element; the current control circuit is coupled to the node and arranged to selectively provide a current to the lighting element according to a Pulse Width Modulation (PWM) signal; the protecting circuit is coupled to the node and arranged to be selectively enabled to limit the voltage of the node according to a control signal to make the voltage of the node maintain a predetermined voltage, wherein the lighting element does not have any current passed through when the voltage of the node maintains the predetermined voltage; and the timing controller is arranged to generate the PWM signal and the control signal.

18 Claims, 7 Drawing Sheets

DRIVING CIRCUIT AND DRIVING METHOD APPLIED TO DISPLAY SYSTEM AND ASSOCIATED DISPLAY SYSTEM

BACKGROUND OF THE INVENTION

1. Field of the Invention

The present invention relates to a driving circuit applied to a display system, and more particularly, to a driving with a protecting circuit to limit a high voltage surge introduced by parasitic inductance, driving method and associated display system.

2. Description of the Prior Art

Refer to FIG. 1, which is a diagram illustrating a display system 100 in the prior art. As shown in FIG. 1, the display system 100 comprises a plurality of Light-Emitting Diodes (LED) $D_1$ to $D_N$, a plurality of nodes $N_1$ to $N_N$, a plurality of transistors $M_1$ to $M_N$, and a plurality of current sources $I_1$ and $I_N$, wherein the transistors $M_1$ to $M_N$ are controlled to be opened or closed by a plurality of Pulse Width Modulation (PWM) signals $V_{en1}$ to $V_{enN}$. The states of the transistors $M_1$ to $M_N$ change between open and close constantly by referring to the PWM signals $V_{en1}$ to $V_{enN}$ to make the states of the LEDs $D_1$ to $D_N$ change between light-on and light-off constantly, and the average luminance of LEDs $D_1$ to $D_N$ are decided according to the time ratio of light-on state and light-off state of the LEDs $D_1$ to $D_N$ (i.e. the duty cycles of the PWM signals $V_{en1}$ to $V_{enN}$).

Refer to FIG. 2, which is an ideal waveform illustrating a voltage of the node $N_1$ and a current of the LED $D_1$ when the PWM signal $V_{en1}$ changes to low level from the high level. As shown in FIG. 2, when the PWM signal $V_{en1}$ is on high level (e.g. 3V shown in FIG. 2), the transistor $M_1$ is conductive to make the LED $D_1$ have a current and illuminate. In this time, the voltage level of the node $N_1$ is 0V. Next, when the PWM signal $V_{en1}$ decreases to 0V from 3V, the current of the LED $D_1$ decreases to OA due to the transistor $M_1$ is non-conductive (i.e. the LED $D_1$ does not illuminate). In this time, the voltage level of the node $N_1$ equals to a supple voltage $V_{LED}$ of the LED $D_1$ (e.g. 5V shown in FIG. 2).

However, because when the PWM signal $V_{en1}$ decreases to low level from the high level to close the transistor M1, there is a parasitic inductance between the node $N_1$ and the LED $D_1$, therefore, the node $N_1$ has a very high voltage surge and damages the circuit. FIG. 3 is a practical waveform illustrates the voltage of the node $N_1$ and the current of the LED $D_1$ when the PWM signal $V_{en1}$ changes to low level from high level. As shown in FIG. 3, the PWM signal $V_{en1}$ decreases to 0V from 3V, the voltage level of the node $N_1$ suddenly jumps to a level close to 25V, in this way, the adjacent circuit of the node $N_1$ might be damaged and influences the circuit. In addition, with the increase of the frequency of the PWM signal $V_{en1}$, the above-mentioned voltage surge phenomenon might be more serious.

SUMMARY OF THE INVENTION

One of the objectives of the present invention is to provide a driving circuit with a protecting circuit to limit the high voltage surge introduced by parasitic inductance, a driving method and associated display system to solve the above-mentioned problems.

According to an embodiment of the present invention, a driving circuit applied in a display system comprises a node, a current control circuit, a protecting circuit and a timing controller, wherein the node is connected to a lighting element; the current control circuit is coupled to the node and arranged for selectively providing a current to the lighting element according to a PWM signal; the protecting circuit is coupled to the node and arranged for selectively enabling to limit the voltage of the node according to a control signal to make the voltage of the node maintain a predetermined voltage, wherein when the voltage of the node maintains the predetermined voltage, there is no current passes through the lighting element; and the timing controller is arranged for generating the PWM signal and the control signal.

According to another embodiment of the present invention, a driving method applied in a display system comprising: providing a driving circuit, wherein the driving circuit comprises a node arranged for connecting to a lighting element, a current control circuit coupled to the node and a protecting circuit coupled to the node; generating a PWM signal to the current control circuit to selectively provide a current to the lighting element generating a control signal to the protecting circuit to selectively enable the protecting circuit to limit the voltage of the node to make the voltage of the node maintain a predetermined voltage, wherein when the voltage of the node maintain a predetermined voltage, there is no current passes through the lighting element.

According to another embodiment of the present invention, a display system comprises a lighting element and a driving circuit, wherein the driving circuit comprises a node, a current circuit, a protecting circuit and a timing controller, wherein the node is arranged to connect to a lighting element; the current control circuit is coupled to the node and arranged for selectively providing a current to the lighting element according to a PWM signal; the protecting circuit is coupled to the node and arranged for selectively enabling to limit the voltage of the node according to a control signal to make the voltage of the node maintain a predetermined voltage, wherein when the voltage of the node maintains the predetermined voltage, there is no current passes through the lighting element; and the timing controller is arranged for generating the PWM signal and the control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 4:
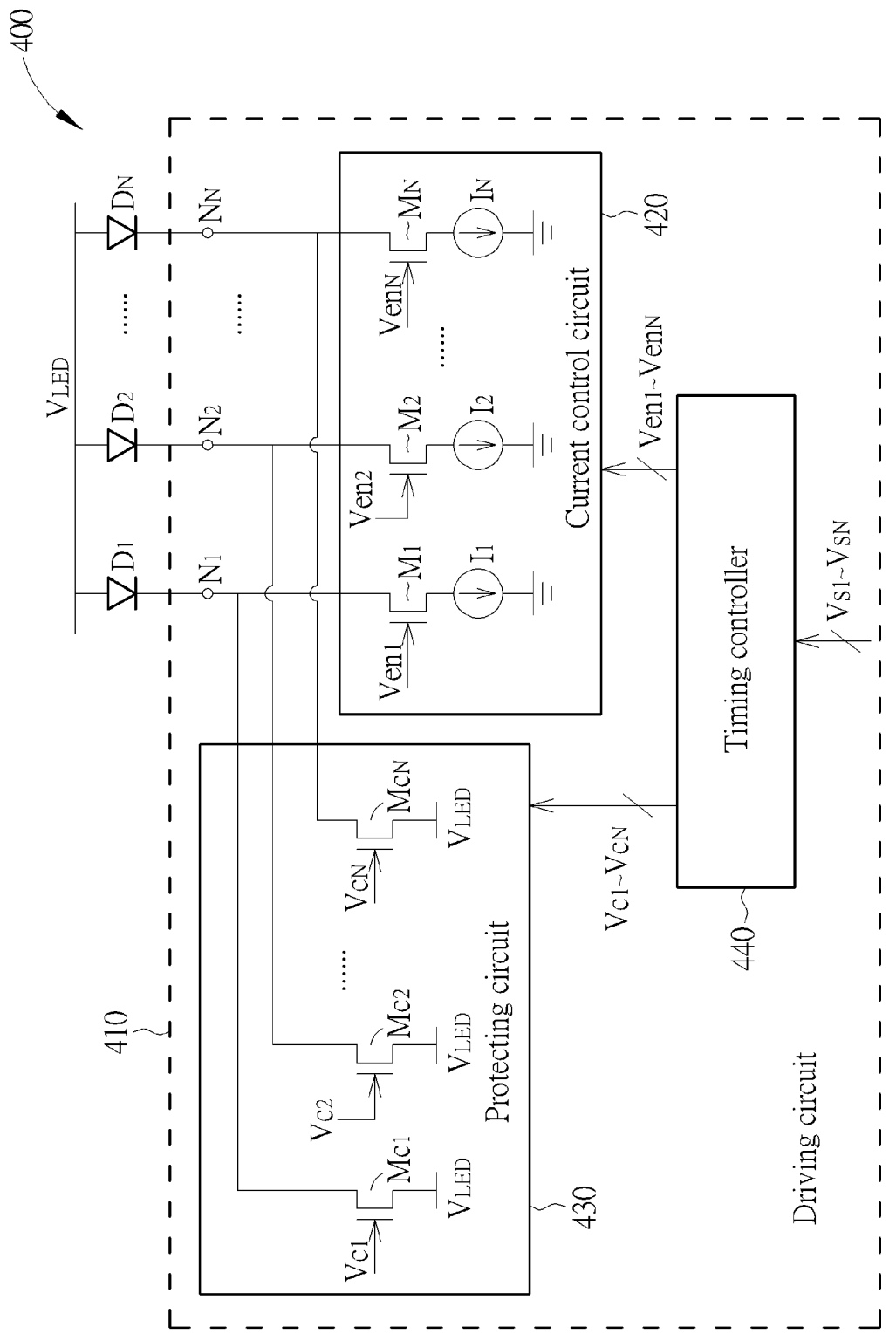
FIG. 4 is a diagram illustrating a display system according to an embodiment of the present invention.

Refer to FIG. 4, which is a diagram illustrating a display system 400 according to an embodiment of the present invention. As shown in FIG. 4, the display system 400 comprises a plurality of lighting elements (in this embodiment, the lighting elements are LEDs $D_1$ to $D_N$) and a driving circuit 410, wherein the LEDs $D_1$ to $D_N$ are coupled to the nodes $N_1$ to $N_N$ of the driving circuit 410, respectively. The driving circuit 410 comprises a current control circuit 420, a protecting circuit 430 and a timing controller 440, wherein the current control circuit 420 comprises a plurality of transistors $M_1$ to $M_N$ and a plurality of current sources $I_1$ to $I_N$, the protecting circuit 430 comprises a plurality of transistors $M_{C1}$ to $M_{CN}$, wherein the sources terminals of the plurality of transistors $M_{C1}$ to $M_{CN}$ are connected to a supply voltage $V_{LED}$ of the LEDs $D_1$ to $D_N$. In addition, in this embodiment, the driving circuit 410 is an independent chip.

In the operation of the system 400, first of all, the timing controller 440 receives the input signals $V_{S1}$ to $V_{SN}$ from the other elements of the driving circuit 410, and the timing controller 440 generates the PWM signals $V_{en1}$ to $V_{enN}$ and the control signals $V_{c1}$ to $V_{cN}$ according to the input signals $V_{S1}$ to $V_{SN}$, wherein the PWM signals $V_{en1}$ to $V_{enN}$ are arranged for controlling the transistor $M_1$ to $M_N$ of the current control circuit 420 to be opened or closed, respectively, and the average luminance of the LEDs $D_1$ to $D_N$ are determined by the time ratio of the open/close states of the transistor $M_1$ to $M_N$, respectively (i.e. the duty cycles of the PWM signals $V_{en1}$ to $V_{enN}$); and the control signals $V_{c1}$ to $V_{cN}$ are arranged for controlling the open/close states of the transistors $M_{C1}$ to $M_{CN}$ of the protecting circuit 430 to selectively limit the voltages of the node $N_1$ to $N_N$.

Figure 1:
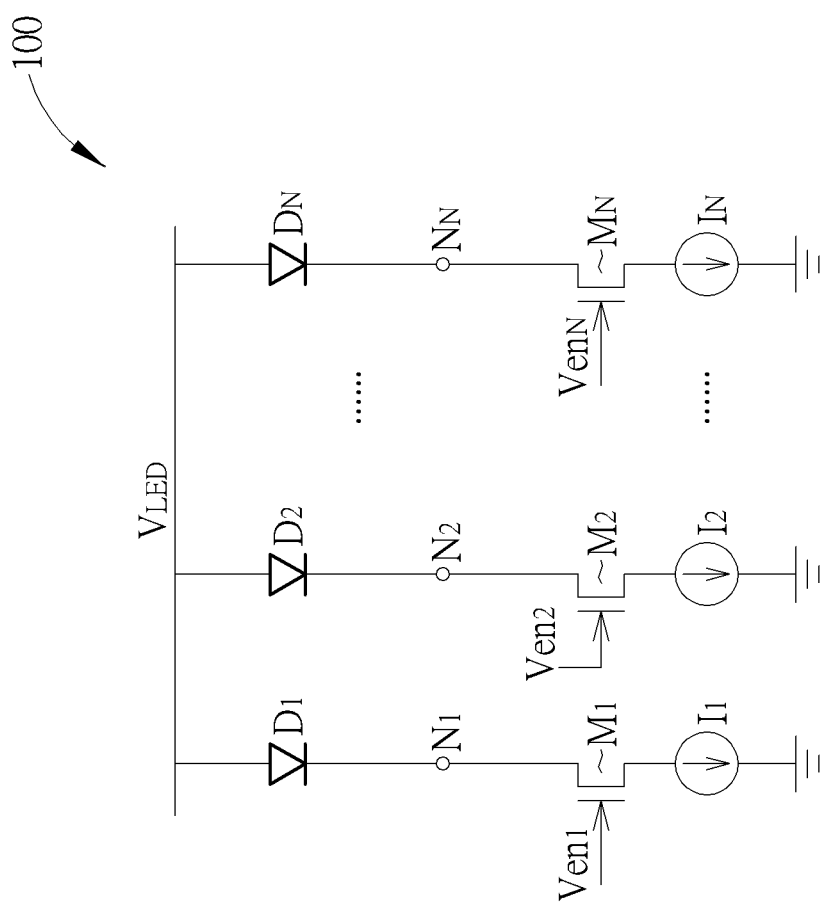
FIG. 1 is a diagram illustrating a display system in the prior art.
Figure 2:
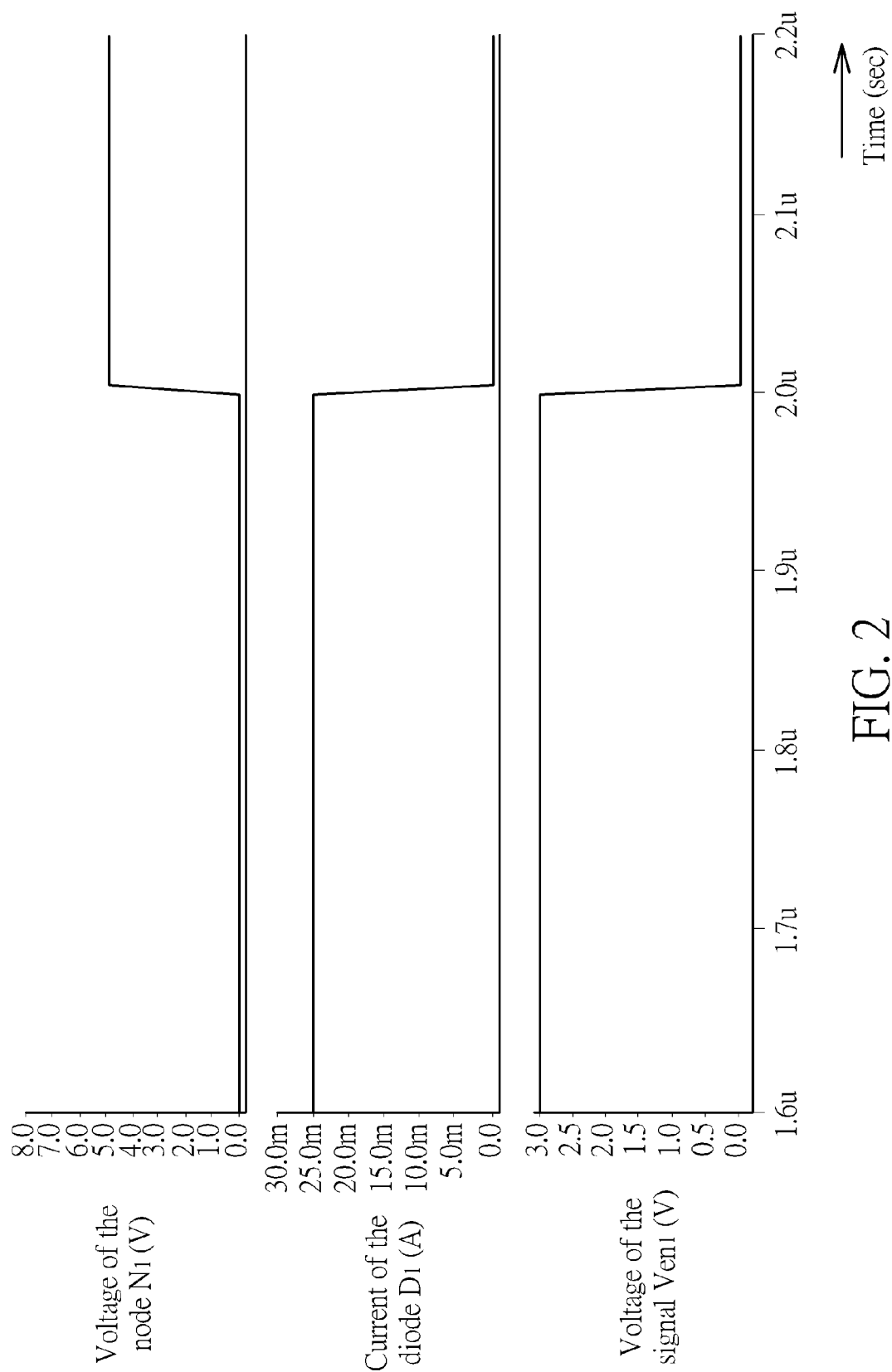
FIG. 2 is an ideal waveform illustrating a voltage of a node $N_1$ and a current of a LED $D_1$ when a PWM signal $V_{en1}$ shown in FIG. 1 changes to low level from high level.
Figure 3:
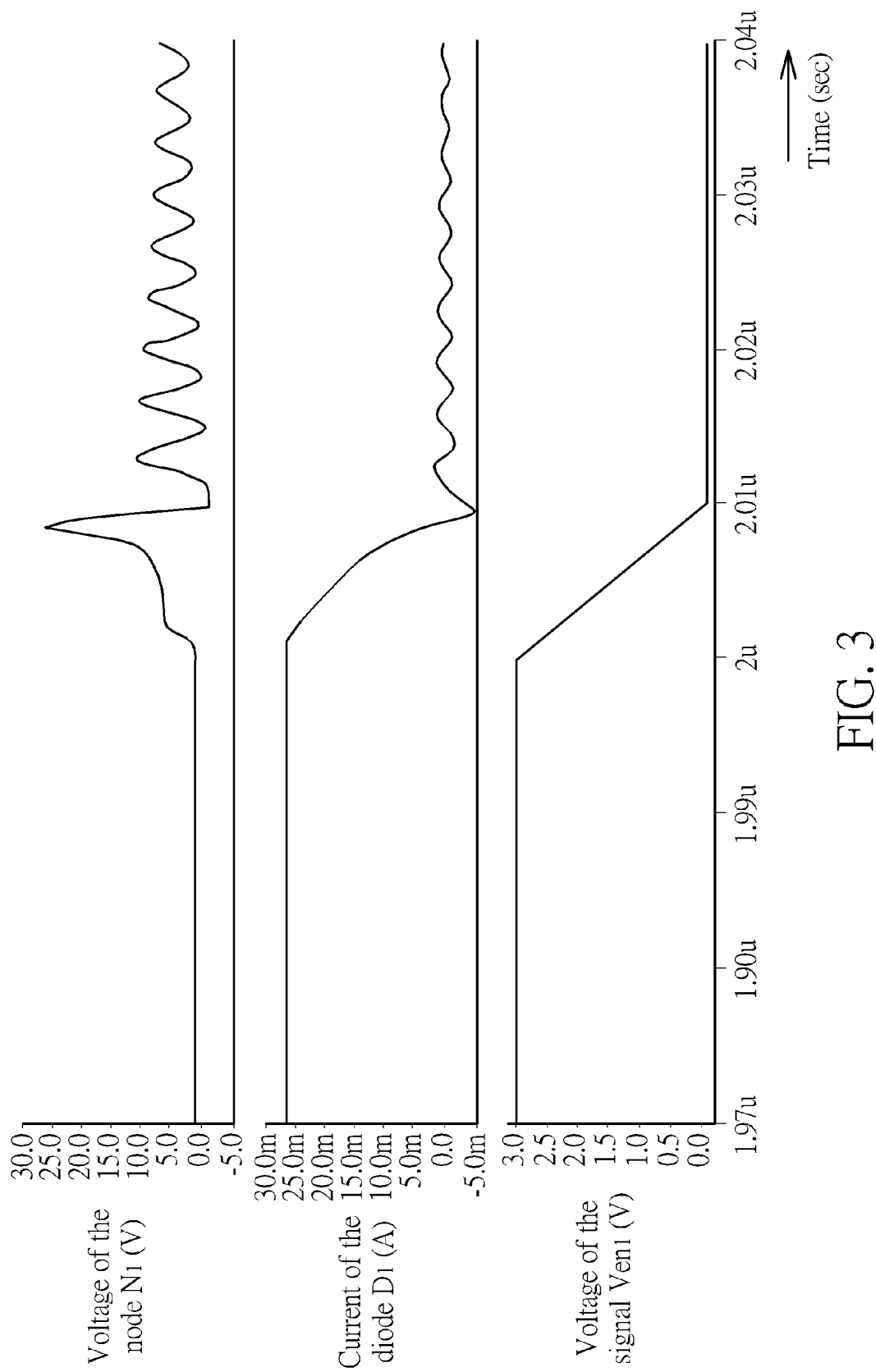
FIG. 3 is a practical waveform illustrating the voltage of the node $N_1$ and the current of the LED $D_1$ when the PWM signal $V_{en1}$ shown in FIG. 1 changes to low level from high level.
Figure 5:
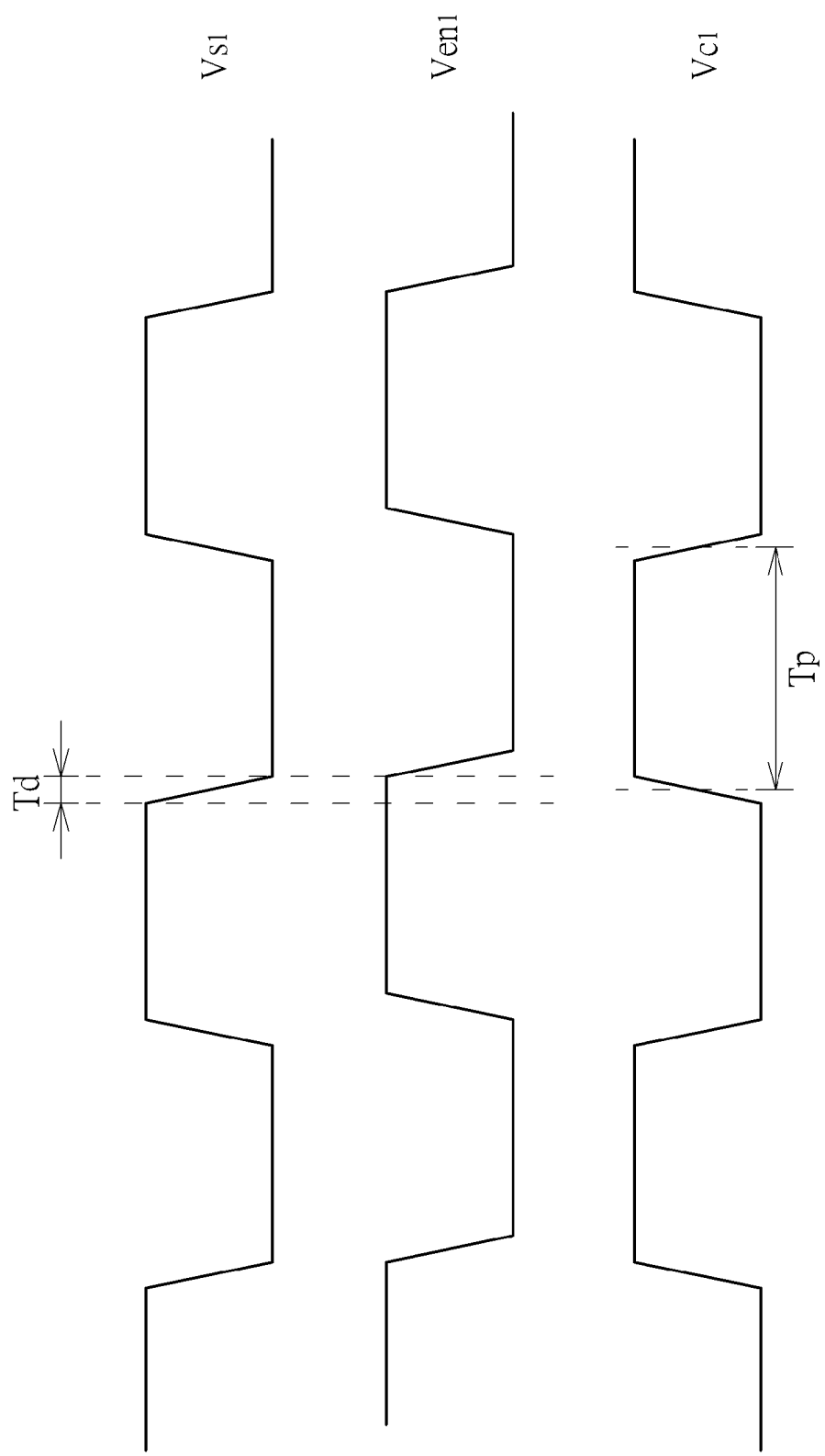
FIG. 5 is a diagram illustrating an input signal $V_{s1}$, an PWM signal $V_{en1}$ and a control signal $V_{c1}$ shown in FIG. 4 according to an embodiment of the present invention.

More specifically, refer to FIG. 5, which is a diagram illustrating the input signal $V_{s1}$, the PWM signal $V_{en1}$ and the control signal $V_{c1}$ according to an embodiment of the present invention. The first set of the input signal $V_{s1}$, the PWM signal $V_{en1}$ and the control signal $V_{c1}$ are used to be explained in FIG. 5, however, the signals in FIG. 5 can be applied to other sets of input signal ($V_{c2}$ to $V_{cN}$), PWM signals ($V_{en2}$ to $V_{enN}$) and control signals ($V_{c2}$ to $V_{cN}$). In the embodiment of FIG. 5, the timing controller 440 delays the input signal $V_{S1}$ to generate the PWM signal $V_{en1}$, wherein there is a delay Td between the PWM signal $V_{en1}$ and the input signal $V_{S1}$, and the timing controller 440 performs inverting operation to the input signal $V_{S1}$ to generate the control signal $V_{C1}$, in this way, before the PWM signal $V_{en1}$ decreases to low level from high level (i.e. before the PWM signal $V_{en1}$ closes the transistor $M_1$ to stop providing current to the LED $D_1$), the control signal $V_{c1}$ opens the transistor $M_{c1}$ in the protecting circuit 430 first, so the transistor $M_{c1}$ in the protecting circuit 430 can discharge the charge stored in the node $N_1$ immediately when the node $N_1$ occurs the high voltage surge shown in FIG. 3 while the PWM signal $V_{en1}$ decreasing to low level from high level to limit the voltage of the node $N_1$ to the supply voltage $V_{LED}$, so the problem that the high voltage surge damages the circuit in prior art can be avoided.

In addition, before the PWM signal $V_{en1}$ increase to high level from low level (i.e. before the PWM signal $V_{en1}$ opens the transistor $M_1$ to provide current to the LED $D_1$), the control signal $V_{c1}$ closes the transistor $M_{c1}$ first to prevent the protecting circuit from forming another current path and affects the current value passed through the LED $D_1$.

Figure 6:
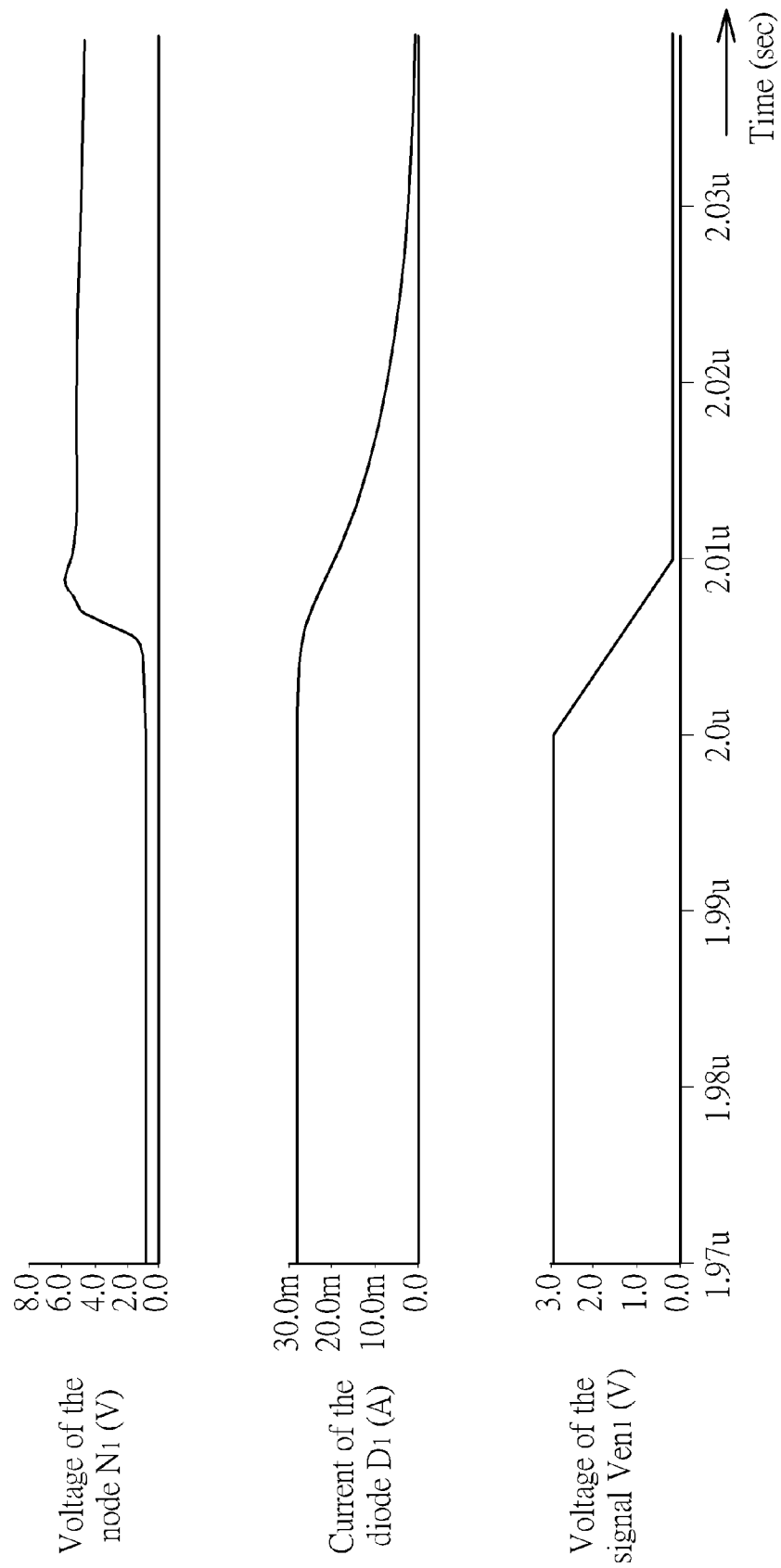
FIG. 6 is a practical waveform illustrating the voltage of the node $N_1$ and the current of the LED $D_1$ when the PWM signal $V_{en1}$ shown in FIG. 4 changes to low level from high level.

Refer to FIG. 6, which is a practical waveform illustrating the voltage of the node $N_1$ and the current of the LED $D_1$ when the PWM signal $V_{en1}$ changes to low level from high level. As shown in FIG. 6, when the PWM signal $V_{en1}$ decreases to 0V from 3V, the voltage level of the node $N_1$ can only reach 6V most, therefore, comparing with the 25V high voltage surge shown in FIG. 3, the display system shown in FIG. 4 can improve the high voltage surge problem in circuit in the prior art indeed to prevent the circuit from damage.

In addition, according to the applicant, the architecture of the circuit in the protecting circuit 430 is only an example, not a limitation of the present invention. For example, the nodes of the transistors $M_{C1}$ to $M_{CN}$ in the protecting circuit 430 can connect to another predetermined voltage instead of the supply voltage $V_{LED}$. The predetermined voltage can be designed according to the requirement of the designer as long as the predetermined voltage can prevent the nodes $N_1$ to $N_N$ from being affected by the high voltage surge, and to make no current pass through the LEDs $D_1$ to $D_N$, when the transistor $M_1$ to $M_N$ in the current control circuit 420 close. For example, the above-mentioned predetermined voltage can locate between ($V_{LED}$−M*Vf) and ($V_{LED}$+M*Vr), wherein M is the number of LED(s) of each LED string (M=1 in the embodiment of FIG. 4), Vf is a positive bias voltage of the LEDs $D_1$ to $D_N$ and Vr is a negative bias voltage of the LEDs $D_1$ to $D_N$. In addition, the protecting circuit 430 is not necessarily to be implemented by the transistors $M_{C1}$ to $M_{CN}$. The protecting circuit 430 can be implemented in any other suitable architectures, as long as the protecting circuit 430 can provide a charge released path when the transistors $M_1$ to $M_N$ in the current control circuit 420 are closed to prevent the nodes $N_1$ to $N_N$ from high voltage surge, and the node $N_1$ to $N_N$ can maintain a suitable voltage level. These alternative designs should fall within the scope of the present invention.

In addition, the description about the timing controller 440 generating the PWM signals $V_{en1}$ to $V_{enN}$ and the control signal $V_{c1}$ to $V_{cN}$ described above, and the input signal $V_{s1}$, the PWM signal $V_{en1}$ and the control signal $V_{c1}$ shown in FIG. 5 are only explanation, not a limitation of the present invention. In other embodiments of the present invention, the timing controller 440 can input the input signals $V_{s1}$ to $V_{SN}$ to the current control circuit 420 directly as the PWM signals $V_{en1}$ to $V_{enN}$, i.e. the delay Td between the PWM signal $V_{en1}$ and the input signal $V_{S1}$ as shown in FIG. 5 does not exist (i.e. the delay Td is very small). In the other words, the time that the PWM signal $V_{en1}$ starts to close the transistor $M_1$ in the current control circuit 420 is very close or equal to the time that the control signal $V_{c1}$ starts to open the transistor $M_{c1}$ in the protecting circuit 430. Additionally, the control $V_{c1}$ can be generated in other ways to make the enable period Tp of the control signal $V_{c1}$ shown in FIG. 5 can be reduced. These alternative designs should fall within the scope of the present invention.

In addition, the LEDs $D_1$ to $D_N$ shown in FIG. 4 are only an explanation. In other embodiments of the present invention, each of the LEDs $D_1$ to $D_N$ can be replaced with other lighting element or a LED string, wherein each LED string can comprise a plurality of LEDs. These alternative designs should fall within the scope of the present invention.

Figure 7:
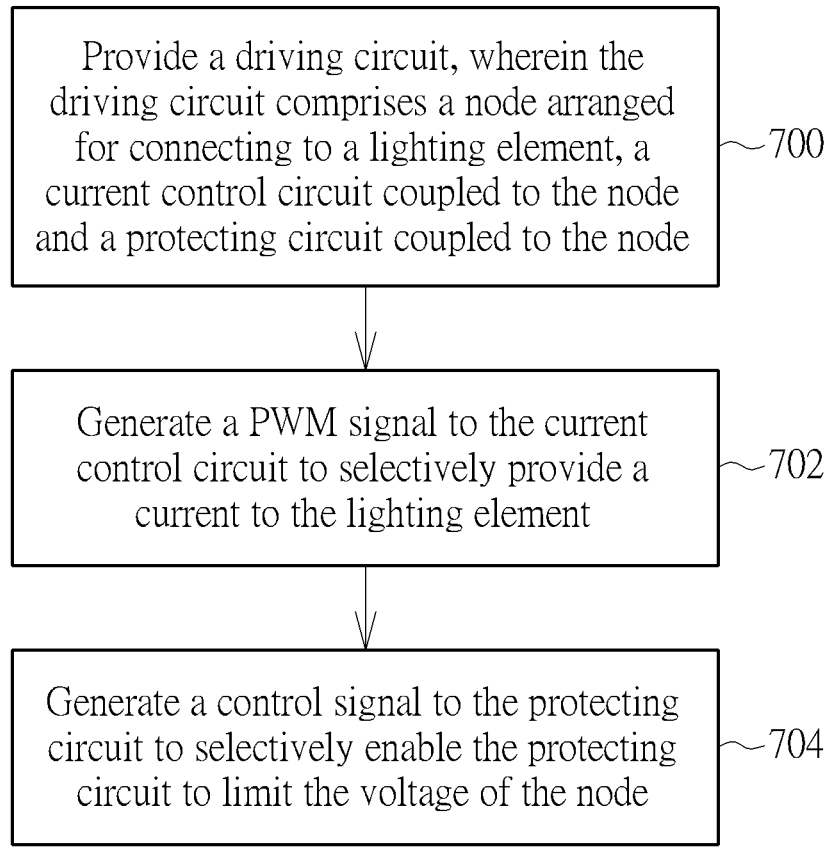
FIG. 7 is a flowchart illustrating a driving method applied in a display system according to an embodiment of the present invention.

Refer to FIG. 7, which is a flowchart illustrating a driving method applied in a display system according to an embodiment of the present invention. Refer to FIG. 4 and FIG. 7, the flow is described as follows.

Step 700: provide a driving circuit, wherein the driving circuit comprises a node arranged for connecting to a lighting element, a current control circuit coupled to the node and a protecting circuit coupled to the node.

Step 702: generate a PWM signal to the current control circuit to selectively provide a current to the lighting element.

Step 704: generate a control signal to the protecting circuit to selectively enable the protecting circuit to limit the voltage of the node.

Briefly summarized, in the driving circuit, the driving method and the associated display system of the present invention, a protecting circuit which can limit the high voltage surge introduced by parasitic inductance is provided. Therefore, by limiting the high voltage surge introduced by parasitic inductance, it can prevent the circuit from damage and does not affect the life of the circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit applied in a display system, comprising:
   a node, arranged for connecting a lighting element;
   a current control circuit, coupled to the node, arranged to selectively provide a current to the lighting element according to a Pulse Width Modulation (PWM) signal;
   a protecting circuit, coupled to the node, arranged to be selectively enabled to limit a voltage of the node according to a control signal to make the voltage of the node maintain a predetermined voltage, wherein the lighting element does not have any current passes through when the voltage of the node maintains the predetermined voltage;
   a timing controller, arranged to generate the PWM signal and the control signal;
   wherein when a level of the PWM signal generated by the timing controller starts to change to make the current control circuit stop providing current to the lighting element, the timing controller generates the control signal to enable the protecting circuit to limit the voltage of the node; and when the level of the PWM signal generated by the timing controller starts to change to make the current control circuit start to provide the current to the lighting element, the timing controller generates the control signal to disable the protecting circuit to make the voltage of the node not be controlled by the protecting circuit.

2. The driving circuit of claim 1, wherein the timing controller receives an input signal and generates the PWM signal and the control signal according to the input signal.

3. The driving of claim 1, wherein a time that the timing controller generates the control signal to enable the protecting circuit to limit the voltage of the node is earlier than a time that the level of the PWM signal starts to change and makes the current control circuit stop providing the current to the lighting element; and a time that the timing controller generates the control signal to disable the protecting circuit is earlier than a time that the level of the PWM signal starts to change and makes the current control circuit start to provide the current to the lighting element.

4. The driving circuit of claim 3, wherein the timing controller receives an input signal and performs a delay operation to the input signal to generate the PWM signal, and the timing controller generates the control signal according to the input signal.

5. The driving circuit of claim 1, wherein the lighting element is a Light-Emitting Diode (LED) string, the LED string comprises M LEDs, the predetermined voltage locates between ($V_{LED}-M*Vf$) and ($V_{LED}+M*Vr$), wherein M is any positive integer equal to or larger than 1, $V_{LED}$ is a supply voltage of the LED string, Vf is a positive bias voltage of each LED and Vr is a negative bias voltage of each LED.

6. The driving circuit of claim 5, wherein the predetermined voltage is the supply voltage of the LED string.

7. A driving method applied in a display system, comprising:
   providing a driving circuit, wherein the driving circuit comprises a node arranged to connect to a lighting element, a current control circuit coupled to the node and a protecting circuit coupled to the node;
   generating a PWM signal to the current control circuit to selectively provide a current to the lighting element;
   generating a control signal to the protecting circuit to selectively enable the protecting circuit to limit a voltage of the node to make the voltage of the node maintain a predetermined voltage, wherein the lighting element does not have any current passed through when the voltage of the node maintain the predetermined voltage;
   wherein the steps of generating the control signal to the protecting circuit to selectively enable the protecting circuit to limit the voltage of the node comprises:
      generating the control signal to enable the protecting circuit to limit the voltage of the node when a level of the PWM signal starts to change and makes the current control circuit stop providing the current to the lighting element; and
      when the level of the PWM signal starts to change and makes the current control circuit start to provide the current to the lighting element, generating the control signal to disable the protecting circuit to make the voltage of the node not be controlled by the protecting circuit.

8. The driving method of claim 7, further comprising:
   receiving an input signal and generating the PWM signal and the control signal according to the input signal.

9. The driving method of claim 7, wherein a time that generating the control signal to enable the protecting circuit to limit the voltage of the node is earlier than a time that the level of the PWM signal starts to change to make the current control circuit stop providing the current to the lighting element; and a time that generating the control signal to disable the protecting circuit is earlier than a time that the level of the PWM signal starts to change to make the current control circuit start to provide the current to the lighting element.

10. The driving method of claim 9, further comprising:
receiving an input signal and performing a delay operation to the input signal to generate the PWM signal and generating the control signal according to the input signal.

11. The driving method of claim 7, wherein the lighting element is a LED string, the LED string comprises M LEDs, the predetermined voltage locates between ($V_{LED}$−M*Vf) and ($V_{LED}$+M*Vr), wherein M is any positive integer equal to or larger than 1, $V_{LED}$ is a supply voltage of the LED string, Vf is a positive bias voltage of each LED and Vr is a negative bias voltage of each LED.

12. The driving method of claim 11, wherein the predetermined voltage is the supply voltage of the LED string.

13. A display system, comprising:
a lighting element; and
a driving circuit, wherein the driving circuit comprises:
  a node, arranged to connect to the lighting element;
  a current control circuit, coupled to the node, arranged to selectively provide a current to the lighting element according to a PWM signal;
  a protecting circuit, coupled to the node, arranged to be selectively enabled to limit a voltage of the node according to a control signal to make the voltage of the node maintain a predetermined voltage, wherein the lighting element does not have any current passed through when the voltage of the node maintains the predetermined voltage; and
  a timing controller, arranged to generate the PWM signal and the control signal;
wherein when the PWM signal generated by the timing controller starts to change to make the current control circuit stop providing current to the lighting element, the timing controller generates the control signal to enable the protecting circuit to limit the voltage of the node; and when the PWM signal generated by the timing controller starts to change to make the current control circuit start to provide the current to the lighting element, the timing controller generates the control signal to disable the protecting circuit to make the voltage of the node not be controlled by the protecting circuit.

14. The display system of claim 13, wherein the timing controller receives an input signal, and generates the PWM signal and the control signal according to the input signal.

15. The display system of claim 13, wherein a time that the timing controller generates the control signal to enable the protecting circuit to limit the voltage of the node is earlier than a time that the level of the PWM signal starts to change to make the current control circuit stop providing the current to the lighting element; and a time that the timing controller generates the control signal to disable the protecting circuit is earlier than a time that the level of the PWM signal starts to change to make the current control circuit start to provide the current to the lighting element.

16. The display system of claim 15, wherein the timing controller receives an input signal and performs a delay operation to the input signal to generate the PWM signal, and the timing controller generates the control signal according to the input signal.

17. The display system of claim 13, wherein the lighting element is a LED string, the LED string comprises M LEDs, the predetermined voltage locates between ($V_{LED}$−M*Vf) and ($V_{LED}$+M*Vr), wherein M is any positive integer equal to or larger than 1, $V_{LED}$ is a supply voltage of the LED string, Vf is a positive bias voltage of each LED and Vr is a negative bias voltage of each LED.

18. The display system of claim 17, herein the predetermined voltage is the supply voltage of the LED string.

* * * * *